United States Patent [19]

Dawson

[11] Patent Number: 4,604,218

[45] Date of Patent: Aug. 5, 1986

[54] AQUEOUS ACID GELS AND USE THEREOF

[75] Inventor: Jeffrey C. Dawson, Katy, Tex.

[73] Assignee: BJ-Titan Services Company, Houston, Tex.

[21] Appl. No.: 717,210

[22] Filed: Mar. 28, 1985

[51] Int. Cl.$^4$ .............................................. E21B 43/27
[52] U.S. Cl. .............................. 252/8.55 3; 166/307; 525/326.6; 526/278
[58] Field of Search ...................... 252/8.55 C, 8.55 R; 526/278; 525/326.6; 166/307

[56] References Cited

U.S. PATENT DOCUMENTS

| | | | |
|---|---|---|---|
| 3,779,914 | 12/1973 | Nimerick | 252/8.55 |
| 4,068,719 | 1/1978 | Clampitt et al. | 252/8.55 X |
| 4,225,445 | 9/1980 | Dixon | 252/8.5 X |
| 4,313,834 | 2/1982 | Harris | 252/8.55 |
| 4,428,432 | 1/1984 | Pabley | 252/8.55 X |
| 4,470,915 | 9/1984 | Conway | 252/8.55 |
| 4,488,975 | 12/1984 | Almond | 252/8.55 |
| 4,518,745 | 5/1985 | Engelhardt et al. | 525/366 X |

*Primary Examiner*—Herbert B. Guynn
*Attorney, Agent, or Firm*—Charles D. Gunter, Jr.

[57] ABSTRACT

Copolymers of a predominant proportion of an alkyl allyl ammonium halide and a vinyl phosphonic acid, optionally with other copolymerizable vinylidene monomers, form aqueous acid gel compositions when added to the aqueous acid, along with a gelling agent selected from titanium or zirconium compounds, and gel destabilizing compounds containing fluoride, sulphate or phosphate anions, the apparent viscosity and time of stability of the acid gel composition being controlled by the addition of these ingredients. These acid gels are particularly effective as fracture-acidizing fluids in deep, hot oil or gas well stimulation.

4 Claims, No Drawings

AQUEOUS ACID GELS AND USE THEREOF

BACKGROUND OF THE INVENTION

Hydrocarbon production strata are often composed of limestone, dolomite and other calcerous materials. The production of hydrocarbons from oil and gas wells drilled into these strata is often less than desired. This is the caused by low permeability of the strata which results in poor conductivity to the wellbore. These formations are often fracture-acidized in an attempt to improve the conductivity. This is accomplished by injecting an aqueous acid solution into the wellbore, causing a fracture in the production strata which provides a permeable, conductive channel from the strata to the wellbore.

The aqueous acid normally used in this operation is hydrochloric acid, in concentrations ranging from 3% to 28%, for stimulation of carbonate formations. In using hydrochloric acid, the reaction of acid with carbonate rock occurs at such a rate that the acid is usually depleted rapidly. This rapid depletion of acids results in a limited depth of penetration of acid into into the formation. To increase the depth of penetration of acid into the formation, acids have been retarded by adding a suitable viscosifying agent, chemical retarders, foaming the acid, emulsifying the acid, or by cross-linking the acid viscosifying agent. Each method of retardation has shown limited use in field applications. These methods of retardation generate fluids of low viscosities and have a low degree of viscous stability (viscosities changing with time) especially with increasing reservoir temperature.

It is advantageous to initially viscosify the fracture-acidizing fluid. The fluid's viscosity is proportionally related to the created fracture geometry and fracture width so that more viscous fluids will produce longer and wider fractures. In addition, the viscosity of the acid will decrease the reaction rate or retard the acid etching, allowing high strength acid to penetrate deep into the fracture during injection. After the viscous acid is injected into the fracture, the viscosity should diminish at a desirable rate to allow the acid to etch the fracture faces. Stable viscosity and control thereof are a problem.

Fracture-acidizing fluids have been previously thickened with synthetic polymers, derivatives of natural materials such as carboxymethyl cellulose, guar, hydroxypropyl guar, biopolymers such as xanthan gum, and the like. The apparent viscosity of such thickened acid fluids is often low and decreases rapidly in strong acids due to the hydrolysis of the polymer especially at higher temperatures i.e., 130° F. Synthetic polymers also often precipitate from solution in the presence of high concentrations of calcium and magnesium ions. Such precipitants tend to plug the formation which can be detrimental to the recovery of the oil and natural gas from the reservoir. Improved thickened fracture-acidizing compositions are an objective of this invention that are effective at the higher operating temperatures found in deep wells.

SUMMARY OF THE INVENTION

Copolymers of a predominant proportion of an alkyl allyl ammonium halide and a vinyl phosphonic acid, optionally with other copolymerizable vinylidene monomers, form aqueous acid gel compositions when added to the aqueous acid, along with a gelling agent selected from titanium or zirconium compounds, and gel destabilizing compounds containing fluoride, sulphate or phosphate anions, the apparent viscosity and time of stability of the acid gel composition being controlled by the addition of these ingredients. These acid gels are particularly effective under high temperature operating conditions.

DETAILED DESCRIPTION

Aqueous acid compositions having controlled viscosity and a method to regulate the apparent viscosity of aqueous acids for use in fracture-acidizing in oil and gas well stimulation are provided by this invention. In the fracturing step, the system can rapidly develop a significant viscosity increase, generate less friction pressure during pumping than the acid fluid, minimize fluid loss to reservoir rock during fracturing, is capable of reducing the viscosity in a controlled manner and does not generate residues after breakout. Generation of wide fractures to allow deeper acid penetration, retardation of reaction rate on the carbonates by hindering the migration of reaction products, and minimized fluid leakoff into formation rocks are among the advantages of this invention. Further, the prior art acid gels are generally not stable at temperatures greater than about 130° F. In contrast, the novel acid gels of this invention are stable at temperatures as high as about 300° F.

This is accomplished by the use of aqueous acids containing copolymers of an alkyl allyl ammonium halide and vinyl phosphonic acid, optionally with other copolymerizable comonomers, that are gelled or cross-linked with titanium or zirconium compounds after addition to the acid, and containing a gel destabilizing agent whereby the acid viscosity is controlled as desired and depending on the requirements of the fracture-acidizing operation. The resulting acid gel composition can be used in very strong acids with minimal polymer degradation, and at the high temperatures often encountered in many wells, with no viscosity breakdown other than when and as designed into the system. Thus the acid gel composition has moderately high viscosities with substantial shear stability at temperatures up to about 300° F.

In addition to high temperature resistance, excellent viscosity characteristics, and reduced pumping friction pressure, the acid reactivity of the acid gel compositions with limestone and the like is drastically reduced and controlled as desired. The acid gel composition is also free of residues in live or spent acid, minimizing potential formation damage and is not precipitated in the presence of calcium and magnesium ions even when neutralized. Further, considerably deeper penetrations may be achieved by these acid gel compositions compared to previous acid formulations.

The system is readily prepared in the field as needed, and provides a method for controlling the apparent viscosity of aqueous acid by employing at least about 0.2 weight percent of the novel copolymers of the invention, along with gelling amounts of the zirconium or titanium cross-linking agents, and controlled amounts of gel destabilizers to allow the controlled acid-calcium carbonate reaction and to facilitate well clean up. Break out of the system is controlled and accomplished without resulting in an insoluble residue.

The alkyl allyl ammonium halides preferably are dialkyl diallyl ammonium chlorides wherein the alkyl groups contain 1 to 4 carbon atoms, such as dimethyl diallyl ammonium chloride, diethyl diallyl ammonium chloride, and the like.

The vinyl phosphonic acids have the formula

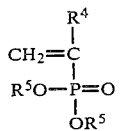

wherein $R^4$ is hydrogen or an alkyl radical containing 1 to 4 carbon atoms, $R^5$ is hydrogen or an alkyl radical containing 1 to 4 carbon atoms, and at least one of $R^5$ is hydrogen. Ammonium or alkali metal salts of the vinyl phosphonic acids may be used. Other comonomers that will provide the same functional groups in the polymer as the vinyl phosphonic acids, under acid conditions, have the formula

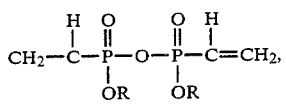

wherein R is hydrogen or alkyl groups containing 1 to 4 carbon atoms.

In the copolymers there is present about 90 to 99 weight percent dialkyl diallyl ammonium halides and about 1 to 10 weight percent vinyl phosphonic acid. In copolymers containing optional comonomers the dialkyl diallyl ammonium halide is present in amounts from about 50 to about 98 weight percent.

Optional comonomers useful in the copolymers include acrylamides having the formula

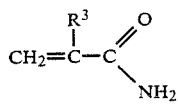

wherein $R^3$ is hydrogen, methyl or ethyl; N-vinylamides having the formula

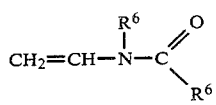

wherein $R^6$ is hydrogen, methyl or hydroxymethyl; and/or different ethylenically-unsaturated vinylidene monomer having the formula

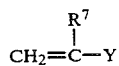

wherein $R^7$ is hydrogen or methyl and Y is selected from the group consisting of cyano; a carboxyl group or its alkali or ammonium salts, alkoxycarbonyl groups having 1 to 6, preferably 1 to 3, carbon atoms; hydroxyalkoxycarbonyl groups having 1 to 3 carbon atoms; the N-methylolamidocarbonyl group $HOCH_2NH$—CO—; methylol groups which may optionally etherified with alkanols having 1 to 4 carbon atoms; an alkanoylamino group having 1 to 4 carbon atoms which may optionally be N-substituted with methylol or alkyl having 1 to 4 carbon atoms, pyrrolidonyl-(1), phenyl, pyridinium; sulfonic acid groups or alkali metal or ammonium salts thereof; radicals of the formula

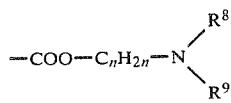

wherein $R^8$ and $R^9$ are the same or different alkyl radicals containing 1 to 4, preferably 1 to 2 carbon atoms, and n represents a number from 1 to 4; or radicals of the formula

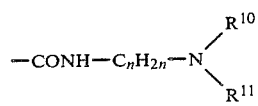

wherein $R^{10}$ and $R^{11}$ are the same or different and represent alkyls having 1 to 4, preferably 1 to 2 carbon atoms and n has the meaning given above; and quaternized moieties of the above two radicals quaternized by dimethyl sulfate or methyl chloride.

Comonomers preferably used include acrylamide, N-vinylformamide, N-vinylacetamide, N-vinyl-N-methylacetamide; N-vinylpyrrolidone; acrylic acid, alkali metal or ammonium salts thereof;

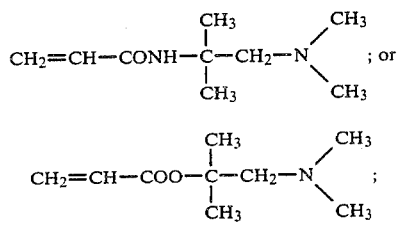

in amounts of 0 to 40 weight percent.

The copolymers may also contain small amounts of other vinylidene monomers containing at least one terminal $>CH_2$ group, so long as such other vinylidene monomers have no adverse effect on the thickening and other essential properties and advantages of the novel composition of this invention. Typical vinylidene comonomers include the alkyl acrylates and alkacrylates; vinyl esters as vinyl acetate; monoolefins and diolefins; vinyl and vinylidene halides; vinyl ethers and ketones; and the like.

The copolymers are readily prepared by methods known and available to those skilled in the art. The polymerizations are normally conducted in closed vessels in an inert atmosphere as nitrogen, the vessel being equipped with heating, cooling and stirring means. The reactions are conducted at temperatures from about 0° C. to about 120° C., more preferably from about 25° C. to about 80° C. under autogenous pressure, or at induced pressures as desired.

The reactions are generally catalyzed by the presence of free-radical forming substances including peroxygen compounds such as potassium persulfate, ammonium persulfate, caprylyl peroxide, benzoyl peroxide, hydrogen peroxide, cumene hydroperoxide, sodium peracetate, sodium(2-ethylhexyl)percarbonate, azobisisobutyro nitrile and the like; and with the so-called redox catalyst systems and heavy metal activated catalysts. Ultraviolet light may be used and heat is often enough to cause polymerization.

The monomers may be batch charged or continuously or intermittently added during the course of the polymerization, or by any other manner or technique normally used by those skilled in the art. The polymerizations may be batch, semi-batch or continuous. Agitation is normally used to obtain adequate mixing and heat transfer.

The polymerizations are usually conducted in a liquid media at a pH greater than about 6, preferably greater than 7.5 to about 9.5. Water is a useful material for those monomers that are sufficiently soluble to allow polymerization. The polymers may be isolated by evaporation of the water, by adding a polymer non-solvent to the aqueous solution. Solvents may be used for the polymerization that are solvents for the monomers and polymers, or that are solvents for the monomers and non-solvents for the polymers. In the former case, the polymers are isolated by evaporation of the solvent or by adding a polymer non-solvent. If the monomers used are not sufficiently soluble in the solvent to allow polymerization, surface active agents can be added in the polymerization media. These are well known and include anionic, cationic and non-ionic materials such as alkali metal alkyl sulfates, alkylaryl sulfonates, fatty acid soaps, polyoxyalkylene materials and the like, and may be used in amounts from two to seven weight percent.

The cross-linking agents used to cross-link the defined copolymers are hereinafter defined compounds of zirconium and titanium. These compounds or complexes are preferably reaction products of zirconium or titanium compounds with organic acids containing 1 to 12 carbon atoms, preferably polyfunctional acids, containing at least 3 carbon atoms, including dicarboxylic acids, hydroxy-carboxylic acids, amine-carboxylic acids; including for example acetic acid, oxalic acid, malonic acid, succinic acid, glutaric acid, adipic acid, pimelic acid, suberic acid, azelaic acid, sebacic acid, maleic acid, fumaric acid, lactic acid, aspartic acid, malic acid, mandelic acid, citric acid, and the like. Particularly useful are the hydroxy-carboxylic acids such as lactic, malic and citric acids. Also useful are the complexes formed with these compounds and ammonia alkyli metals, amines containing 1 to 6 carbon atoms, including methyl amine, propyl amine, diethylamine, triethylene tetramine, isopropyl amine, and the like; and hydroxyl amines such as triethanolamine, diethanol amine, and the like. Typical compounds include titanium lactate, titanium malate, titanium citrate, zirconium lactate, zirconium malate, zirconium citrate and the like, and NH$_3$ or alkali metal complexes thereof, i.e., ammonium zirconium lactate, sodium zirconium lactate, zirconium lactate in combination with isopropylamine or triethanolamine, in ratios of 1 mole of Zr to 2 moles of amine, and the like.

The concentrations of metal cross-linker calculated as ZrO$_2$ or TiO$_2$ should range from 0.25 to 5.0 percent by weight based on the weight of polymer. In fracture-acidizing applications, the optimal apparent viscosity should be achieved within less than about one minute after addition of the cross-linker. The cross-linker is added as an aqueous dilute solution to obtain a homogenous, uniform gel. The viscous stability of the fluid should exceed 6 hours at temperatures less than 300° F. The time of gel stability is controlled by the addition of gel degrading substances.

In fracture-acidizing applications, the time necessary to inject the acid solution into the well after preparation will vary depending on the acid volume, reservoir and treatment conditions. It is important to control the gel stability so that gel degradation occurs soon and only after the acid is injected and placed in the fracture. The rate of gel degradation is controlled in accordance with this invention by the concentration of a gel degrading substance. The substances applicable in this invention are compounds which contain fluoride, phosphate or sulfate anions, and multi-carboxylated compounds such as ethylene-diamine tetraacetic acid or its ammonium, alkali or alkaline earth salts, which are soluble under the acid conditions of the aqueous acid compositions. Useful is a combination of fluoride ion and ethylenediamine tetraacetic acid. The fluoride substances include cryolite, Na$_3$AlF$_6$, alkali metal hexafluorophosphates, fluorosilicates, tetrafluoroborates, usually sodium or potassium, alkyl or aryl sulfurylfluorides, and organic halides such as

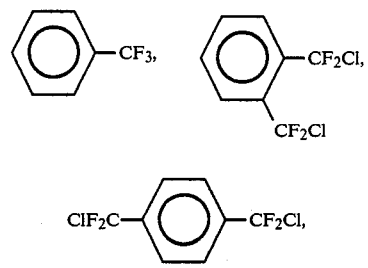

and the like. Typical phosphates include alkali and alkaline earth metal phosphates, and the like; and typical sulfates include alkali and alkaline earth metal sulfates, as sodium or potassium.

The rate of fluoride release can be better controlled by encapsulating the solid fluoride substance with synthetic polymers or natural gums or preparing water-in-oil emulsions of aqueous fluoride solutions, as is well known to those skilled in the art. The desired concentration of fluoride anion used is within the range of about 1 to about 10 weight percent, preferably 2 to 9, based on the weight of polymer. The concentration of ethylenediamine tetraacetic acid should range from about 5 to about 15 weight percent, preferably 7 to 12, based on the weight of polymer. The gel degrading substance preferably is added to the polymer solutions prior to adding the cross-linking agent to ensure a homogeneous blend.

The copolymers of this invention are readily soluble in water or aqueous acid solutions and hence can be easily handled. In fracture-acidizing applications, the polymer can be introduced to the acid solution in the form of finely ground powders, as an aqueous polymer solution usually ranging from about 0.5% to about 6% by weight; hydrocarbon dispersions containing emulsifiers and 20 to 50% polymer by weight; or oil-in-water or water-in-oil emulsions containing emulsifiers and 20 to 50% polymer by weight. As a result of the novel polymers composition and properties they are effective acid viscosifiers for extended periods of time in concentrations ranging from greater than about 0.1 to 12 or more, preferably 0.30 to 0.95, from temperatures ranging from ambient to 300° F.

The acids commonly used for fracture-acidizing compositions and compatible with the macromolecule and cross-linking system of this invention are normally inorganic or strong lower organic acids having small pKa values at 25° C. of less than 5. Examples of these acids including hydrochloric, formic, acetic and mono-, di- or trichloroacetic acids, and the like. The most commonly used acid is hydrochloric acid ranging in concentration from 3% to 28% by weight.

In preparing the claimed composition in acid, the polymer is dissolved in hydrochloric acid, the gel destabilizer added just prior to addition of the cross-linking agent as described in the Examples hereinafter.

The following working example demonstrates the practice of the invention to regulate the viscosity of acidic fluids.

100.00 grams of distilled water, 2.00 grams of vinyl phosphonic acid and 83.07 grams of a 65% by weight aqueous dimethyl diallylammonium chloride solution were added to a 500 ml reaction vessel. The pH was adjusted to 8.70 with 1.72 grams of 26° Be Aqua Ammonia. Then, 37.82 grams of acrylamide was added followed by 97.00 grams of distilled water, and 1.00 ml of 1.28% aqueous tetrasodium ethylenediaminetetraacetate. After degassing the solution with nitrogen, the solution was treated with 1.0 ml of 0.2% aqueous sodium bisulfite and 2.0 ml of 4.59% aqueous ammonium persulfate. The solution was heated to 46° C. After 5 hours, a viscous gel resulted. The water was evacuated from the gel yielding a dry crystalline substance which was easily ground to a fine white powder. Into a Waring blender containing 500 ml of 15% by weight HCl, was added 6.00 grams of the polymer prepared above. With moderate shear, the polymer hydrated in 30 minutes. The polymer solution was treated with 0.3 grams of potassium hexafluorophosphate and 2.5 ml of an aqueous zirconium lactate and citrate solution containing 0.89% by weight zirconium. Cross-linking occurred in 10 seconds yielding a homogenously cross-linked gel. The viscosity declined slowly at 23° C. over a period of 6 hours to about 15 cps at 511 1/sec.

To demonstrate the heat stability of the cross-linked polymer, 2.88 grams of this polymer was added to 400 ml of 15% by weight HCl. After hydrating for 6 hours, the solution had a viscosity of 13 cps at 75 1/sec. on a Fann 35 VG meter. The solution was treated with 2.40 grams of citric acid as a 50% wt/wt aqueous solution and 2.0 ml of an aqueous zirconium lactate citrate solution containing 0.89% by weight zirconium. Cross-linking occurred with 15 seconds yielding a homogenously cross-linked gel. The apparent viscosity was measured with a Fann 35 VG meter. The fluid apparent viscosity was 900 cps at 75 1/sec. The gel was heated to 180° F.

The time and apparent viscosity at temperature at 75 1/sec. data are shown below.

| Time (hr) | 75 1/sec. |
|---|---|
| Start | 900 |
| 2 | 846 |
| 4 | 542 |
| 5 | 237 |

This is to be compared to values obtained with presently available additives that after 2 hours at this temperature usually result in values of less than about 20.

The invention provides a novel method to regulate the apparent viscosity of aqueous acids. The acid is initially viscosified with small amounts of the defined polymer containing pendant phosphonic groups. The fluid viscosity of the solution is then significantly rapidly increased in several seconds, in excess of 900 cps at 75 sec$^{-1}$, by cross-linking the added polymer with the defined titanium or zirconium compounds. The result is a firm, viscolelastic acid gel. The fluid viscosity can then be reduced over a period of time as desired by the presence of compounds containing fluoride, phosphate or sulfate groups. These anions eventually degrade the cross-linked structure so that the aqueous acid returns to a viscosity of less than 20 cps. The composition of this invention normally develops in less then one minute a significant viscosity, even in concentrated acids at temperatures as high as 180°–200° F. The pumping friction pressure of the gelled acids is below that of the ungelled acid pumped at the same rate. Further, the breakout of the system is controllable and accomplished without generation of measurable residues. This novel system provides new and useful advantages in acidizing and fracturing operations in oil and gas wells.

What is claimed is:

1. An aqueous acid gel useful in fracture acidizing of oil and gas wells, comprising:
    an aqueous acid;
    at least about 0.2 weight percent based upon the weight of aqueous acid of a copolymer of about 90 to 99 weight percent dialkyl diallyl ammonium halide, wherein the alkyl groups contain 1 to 4 carbon atoms, and about 1 to 10 weight percent of vinyl phosphonic acid of the formula

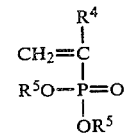

wherein $R^4$ is hydrogen or an alkyl radical containing 1 to 4 carbon atoms, $R^5$ is hydrogen or an alkyl radial containing 1 to 4 carbon atoms, and at least one of $R^5$ is hydrogen;
    a cross-linking agent, present in a gelling amount, which is the reaction product of zirconium or titanium compounds with organic acids containing 1 to 12 carbon atoms, the cross-linking agent, calculated as $ZrO_2$ or $TiO_2$, being present in the range from 0.25 to 5.0 weight percent based on the weight of polymer; and
    said gel further comprising a gel destabilizing amount of an acid soluble compound selected from the group consisting of compounds containing fluoride ions, alkali metal and alkaline earth metal phosphates and alkali metal and alkaline earth metal sulfates, said acid soluble compound being present in the range from about 1 to 10 weight percent, based on the weight of polymer.

2. The aqueous acid gel of claim 1, wherein said acid soluble compound is selected from the group consisting of cryolite, $Na_3AlF_6$, and alkali metal hexafluorophosphates.

3. An aqueous acid gel useful in fracture acidizing of oil and gas wells, comprising:
    an aqueous acid;
    at least about 0.2 weight percent based upon the weight of aqueous acid of a copolymer of about 50 to 98 weight percent dialkyl diallyl ammonium halide, wherein the alkyl groups contain 1 to 4 carbon atoms, about 1 to 10 weight percent of vinyl phosphonic acid of the formula

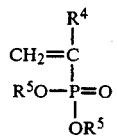

wherein $R^4$ is hydrogen or an alkyl radial containing 1 to 4 carbon atoms, $R^5$ is hydrogen or an alkyl radial containing 1 to 4 carbon atoms, and at least one of $R^5$ is hydrogen, and about 1 to 40 weight percent acrylamide having the formula

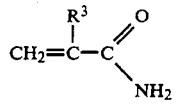

wherein $R^3$ is hydrogen or methyl;

a cross-linking agent, present in a gelling amount, which is the reaction product of zirconium or titanium compounds with organic acids containing 1 to 12 carbon atoms, the cross-linking agent, calculated as $ZrO_2$ or $TiO_2$, being present in the range from 0.25 to 5.0 weight percent based on the weight of polymer; and said gel further comprising a gel destabilizing amount of an acid soluble compound selected from the group consisting of compounds containing fluoride ions, alkali metal and alkaline earth metal phosphates and alkali metal and alkaline earth metal sulfates, said acid soluble compound being present in the range from about 1 to 10 weight percent, based on the weight of polymer.

4. An aqueous acid gel useful in fracture acidizing of oil and gas wells, comprising:
an aqueous acid;
at least about 0.2 weight percent based upon the weight of aqueous acid of a copolymer of about 50 to 98 weight percent dialkyl diallyl ammonium halide, wherein the alkyl groups contain 1 to 4 carbon atoms, about 1 to 10 weight percent of vinyl phosphonic acid of the formula

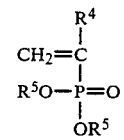

wherein $R^4$ is hydrogen or an alkyl radial containing 1 to 4 carbon atoms, $R^5$ is hydrogen or an alkyl radial containing 1 to 4 carbon atoms, and at least one of $R^5$ is hydrogen, and about 1 to 40 weight percent N-vinylamide of the formula

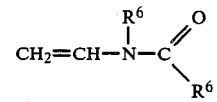

wherein the $R^6$ is hydrogen, methyl or hydroxymethyl;

a cross-linking agent, present in a gelling amount, which is the reaction product of zirconium or titanium compounds with organic acids containing 1 to 12 carbon atoms, the cross-linking agent, calculated as $ZrO_2$ or $TiO_2$, being present in the range from 0.25 to 5.0 weight percent based on the weight of polymer; and said gel further comprising a gel destabilizing amount of an acid soluble compound selected from the group consisting of compounds containing fluoride ions, alkali metal and alkaline earth metal phosphates and alkali metal and alkaline earth metal sulfates, said acid soluble compound being present in the range from about 1 to 10 weight percent, based on the weight of polymer.

* * * * *